United States Patent [19]
Smithson

[11] Patent Number: 4,938,431
[45] Date of Patent: Jul. 3, 1990

[54] VEHICLE SEAT BELT RETRACTOR

[75] Inventor: Alan G. Smithson, Cumbria, England

[73] Assignee: BSRD Limited, Cumbria, England

[21] Appl. No.: 188,364

[22] Filed: Apr. 29, 1988

[30] Foreign Application Priority Data

May 1, 1987 [GB] United Kingdom ............ 8710465

[51] Int. Cl.⁵ .......................................... B60R 22/40
[52] U.S. Cl. .................................................. 242/107.2
[58] Field of Search ...................... 242/107.2, 107.3; 297/479, 476; 280/806

[56] References Cited

U.S. PATENT DOCUMENTS

| 3,494,571 | 2/1970 | Stoffel | 280/807 |
| 3,504,867 | 4/1970 | Stevenson | 242/107.2 |
| 4,306,735 | 12/1981 | Pfeiffer | 280/807 |

FOREIGN PATENT DOCUMENTS

| 0185367 | 6/1986 | European Pat. Off. |
| 3306434 | 8/1984 | Fed. Rep. of Germany |
| 3423360 | 2/1986 | Fed. Rep. of Germany |
| 2113978 | 8/1983 | United Kingdom |
| 2126876 | 4/1984 | United Kingdom |
| 2177891 | 2/1987 | United Kingdom |

Primary Examiner—Katherine A. Matecki
Attorney, Agent, or Firm—Marjama & Pincelli

[57] ABSTRACT

The web-locker retractor has a pair of identical clamping wedges having teeth which are shaped to penetrate the material of a seat belt in order to displace the fibres of the material and engage therewith. Upon an engagement with the belt, the teeth interfit with those of one wedge fitting between those of the other. The teeth are arranged in arrays one of which is an offset mirror image of the other. The teeth of the two arrays are inclined oppositely to the direction of belt protection. Posts and sockets on the wedges co-operate to restrain the wedges to move perpendicularly to the belt plane, against a biasing spring. Upon locking, the web locker does not deflect the belt and therefore does not have to overcome a component of the tensile load on the belt. A retractor of light construction is therefore possible.

17 Claims, 4 Drawing Sheets

FIG. 2
FIG. 3
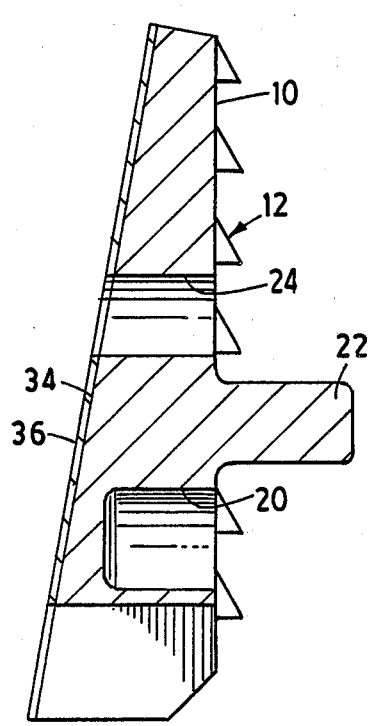
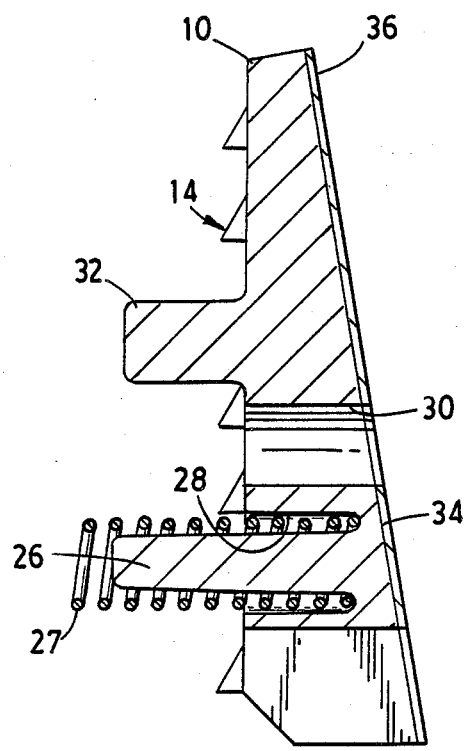

VEHICLE SEAT BELT RETRACTOR

BACKGROUND TO THE INVENTION

1. Field of the Invention

This invention relates to vehicle seat belt retractors of the type which include a belt storage device, usually a spool, and a clamping device which engages the belt to prevent protraction thereof from the storage device. Such a clamping device is often called a "web locker".

2. Description of Prior Art

Examples of vehicle seat belt retractors which include web lockers can be found in patent specifications GB-A-2113978, GB-A-2126876 and GB-A-2177891. In all these specifications, the retractor has a belt storage spool and a web locker which comprises one or a pair of clamping wedges. The or each wedge has a planar front face for engagement with the belt and extending parallel to the plane thereof. A rear face of the or each wedge, inclined to the front face, is in sliding contact with an oppositely-inclined surface on the retractor frame. The wedge or wedges are moved towards the belt, and into clamping engagement therewith, when they are acted upon by an operating means of the retractor which produces a force directed substantially in the direction of protraction of the belt. The movement of the wedge(s) into engagement with the belt has a substantial component in the direction of belt protraction.

A web locker retractor of a different type is described in patent specification EP-A-0185367. Here a clamping block mounted on a swinging arm is brought into clamping engagement with the belt in order to arrest protraction of the belt from a storage spool. The surface of the block which contacts on face of the belt has a close-packed array of teeth, whilst a surface of the retractor frame with which the other face of the belt is pushed into contact has a low coefficient of friction and is, for example, a surface of a layer of polytetrafluoroethylene. In contrast to the retractors discussed above, the clamping block moves to its clamping position substantially perpendicularly to the plane of the belt; this movement has no significant component in the direction of belt protraction.

Patent specifications DE-A-3306434 and US-A-3504867 describe safety belt systems in which web-lockers having corrugated jaws are operable to divert a run of seat belt from a linear path into a zig-zag path, in which protraction of the belt is prevented by a capstan-like action of the jaws on the belt. In these web-lockers, a component of the tensile load on the belt acts against the web-locker clamping force and therefore tends to resist clamping. This increases the response time of the web-locker and requires the web-locker to be mounted in a structure which is very strong and rigid and correspondingly heavy.

SUMMARY OF THE INVENTION

An object of the present invention is the provision of a more efficient web-locking retractor, particularly one which can meet the increasingly more stringent standards which authorities are continually laying down. These standards include ones directed to the rapidity and security of locking of seat belt retractors and set criteria which have to be met even when the seat belt surface is contaminated by substances such as oil, mud and the rust-proofing compounds which are often applied to motor vehicles. Such criteria are obviously important in retractors which include web lockers because locking relies, at least in part, on engagement of the web locker with the seat belt. Rapidity of locking is of course desirable so that the least amount of belt protraction, and hence forward movement of the seat belt user, takes place before protraction is arrested. Because some motor manufacturers specify very stringent maximum weight requirements, it is also an object of the invention for the web-locker retractor to be relatively light in weight, whilst still being able to resist a specified tensile load on the seat belt.

According to the present invention, there is provided a vehicle seat belt retractor comprising a belt storage means from which a vehicle seat belt can be protracted for use, clamping means operable to engage the belt and prevent further protraction thereof and operating means for the clamping means, the operating means being responsive to a predetermined condition to cause operation of the clamping means which comprise first and second belt-engagement surfaces which are movable towards each other and into engagement with the belt so that the belt is clamped between the surfaces and protraction of the belt is prevented, wherein each belt-engagement surface has spaced protruding formations, the formations being shaped to penetrate into the material of the belt in order to engage therewith and being arranged so that, upon clamping, the formations of one surface are received in the spaces between the formations of the other surface and the belt is clamped therebetween.

The belt storage means will usually comprise a storage spool; the predetermined condition will usually be a threshold acceleration (which here comprehends deceleration) of the belt and/or a vehicle in which the retractor is mounted.

With such a retractor, a particularly positive and secure clamping of the belt can be achieved and, accordingly, belt protraction after onset of the predetermined condition can be reduced to a low value. Relevant safety requirements can be met, particularly those requirements which call for effective clamping of a contaminated belt. Moreover, since the belt-engagement surfaces move towards each other to engage the belt and because the clamping surface formations penetrate the material of the belt to engage therewith, the belt is substantially undeflected from its operating plane during clamping. Accordingly, clamping is effected without movement of the belt-engagement surfaces towards the belt being resisted by the tensile load on the belt. As a result, the retractor can be of lighter construction than would be the case if it had to withstand such forces being transferred to the clamping means.

Conveniently, the belt-engagement surfaces are front surfaces of respective clamping wedges, for example wedges of the type shown in specifications GB-A-2126876 and GB-A-2177891. It is accordingly a preferred feature of the present invention that the first and second belt-engagement surfaces are front surfaces of respective clamping wedges which each have a rear surface which is inclined to the belt protraction direction and is in sliding contact with an oppositely-inclined surface of a further member, whereby, upon relative sliding movement between the wedges and the further members in response to the operating means, the belt-engagement surfaces move into engagement with the belt.

More preferably, the further members are fixed parts of the retractor frame and the wedges are moveable relative thereto in response to the operating means.

When the or each belt-engagement surface is movable into engagement with the belt with a movement having a component in the belt-protraction direction, initial contact with the protracting belt will tend to cause the engagement surface to be drawn by the belt in the protraction direction and thus into clamping engagement with the belt. Particularly rapid clamping can thus be obtained.

Advantageously, each belt-engagement surface has an array of teeth which are spaced-apart in two orthogonal directions parallel and perpendicular to the protraction direction.

In a preferred arrangement, each surface is divided into two zones about a line, preferably extending in the belt-protraction direction, the zone to one side of the line being an offset mirror image of the other zone. Such a construction can make it possible for the belt-engagement surfaces to be surfaces of identical elements which, when positioned to face each other on opposite sides of the belt, will interact in accordance with the invention. Economies in manufacture can thus be achieved.

It is preferred that the formations of the belt-engagement surfaces engage the belt to produce a clamping force which has components in the plane of the belt and respectively parallel to the belt-protraction direction and perpendicular thereto. Such an arrangement assists in making the belt-engagement surfaces effective with a range of types of belt webbing. To achieve such force components, the formations may comprise teeth which are inclined to the belt-protraction direction, at, for example an angle of about 20 degrees thereto. Advantageously the teeth are in two zones lying to opposite sides of a line, preferably extending in the belt-protraction direction, the teeth of the two zones being oppositely-inclined relative to the line. Conveniently, each tooth is symmetrical about a median line which is inclined to the belt-protraction direction.

Preferably, the leading edge or face of each tooth relative to the direction of belt protraction is slightly undercut and makes an angle of, for example, about 5 degrees with a line normal to the plane of the belt. The trailing edge or face of each tooth is preferably inclined at an angle of 20 to 40 degrees to the plane of the belt. Most preferably, the teeth have irregular pyramidal shapes, the vertex of the pyramid being somewhat rounded and the pyramid having a leading undercut face, inclined at about 5 degrees to the normal to the plane of the belt, a trailing face inclined at 30 degrees to the belt plane and side faces making angles of 65 to 70 degrees with the plane of the belt. The irregular shape of the teeth again assists in making the belt-engagement surfaces effective with a range of webbing types.

Preferably, the belt-engagement surfaces are surfaces of clamping members which have means restraining the members for movement relative to each other in directions perpendicular to the belt plane. These restraining means conveniently comprise one or more posts protruding from each member and received in corresponding apertures in the other member. In such constructions, it is again possible to employ two identical clamping members, the restraining means of which interengage when the members face each other across the belt of the retractors. Manufacturing economies can thus again be achieved.

Advantageously, resilient biasing means act between the clamping members to bias these apart. The biasing means conveniently comprise a compression spring around any said post provided.

The web locker arrangement of the retractor of this invention can also find application at other locations in a seat belt system: the invention accordingly also provides belt clamping means for the belt of a vehicle seat belt system, the clamping means comprising first and second belt-engagement surfaces which are movable towards each other and into engagement with the belt so that the belt is clamped between the surfaces and protraction of the belt is prevented and operating means for the clamping means, wherein the operating means are responsive to a predetermined condition to cause operation of the clamping means and each belt-engagement surface has spaced protruding formations, the formations being shaped to penetrate into the material of the belt in order to engage therewith and being arranged so that, upon clamping, the formations of one surface are received in the spaces between the formations of the other surface and the belt is clamped therebetween.

BRIEF DESCRIPTION OF THE DRAWINGS

An embodiment of the invention will now be described with reference to the drawings of this specification. In the drawings:

FIG. 2 is a sectional view on the line II—II of FIG. 1, FIG. 3 is a sectional view on the line III—III of FIG. 1.

DESCRIPTION OF THE PREFERRED EMBODIMENT

Figure 7:
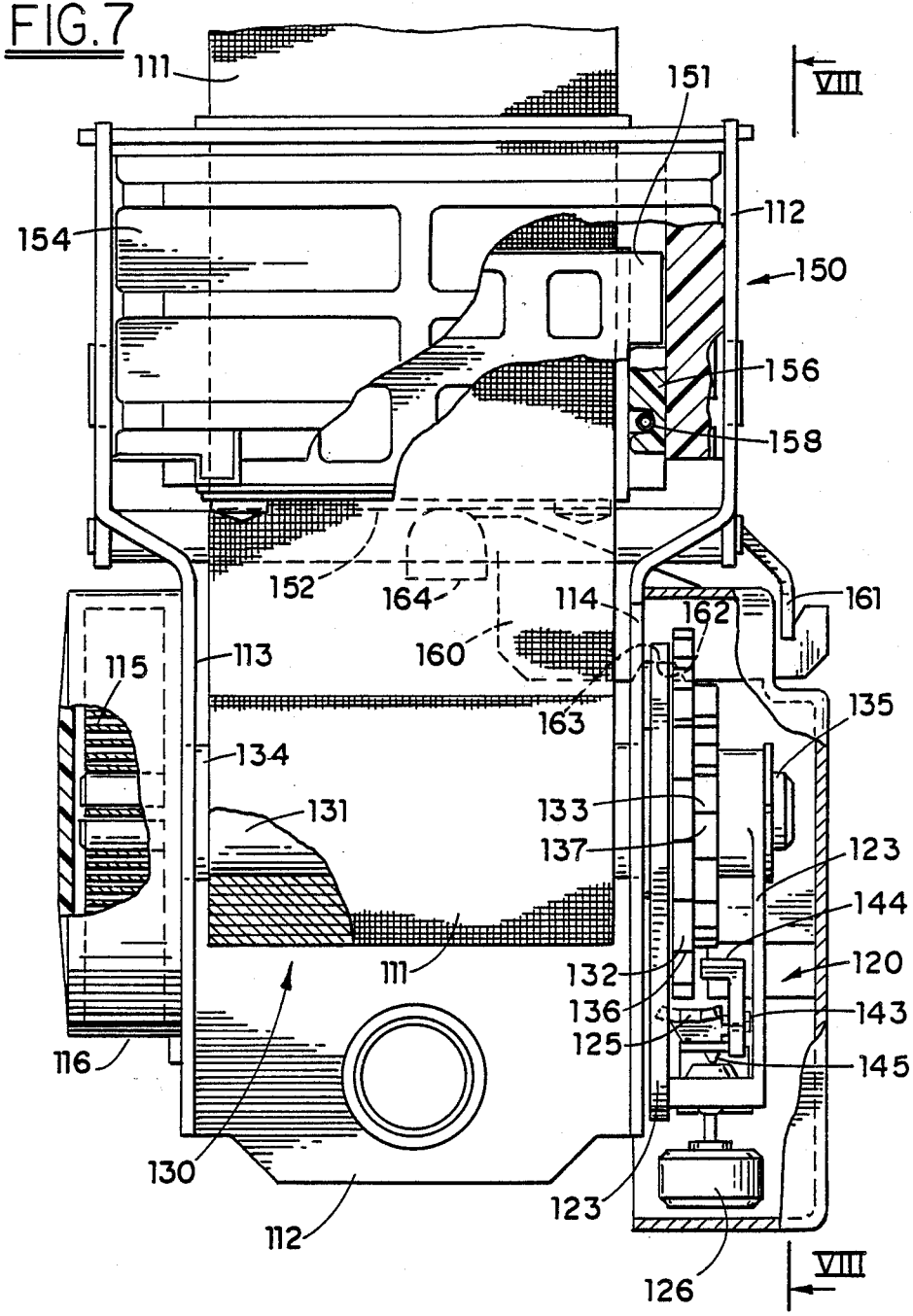
FIG. 7 is a partial cutaway front elevational view of a prior art seat belt retractor as disclosed in GB Patent A-2126876.
Figure 8:
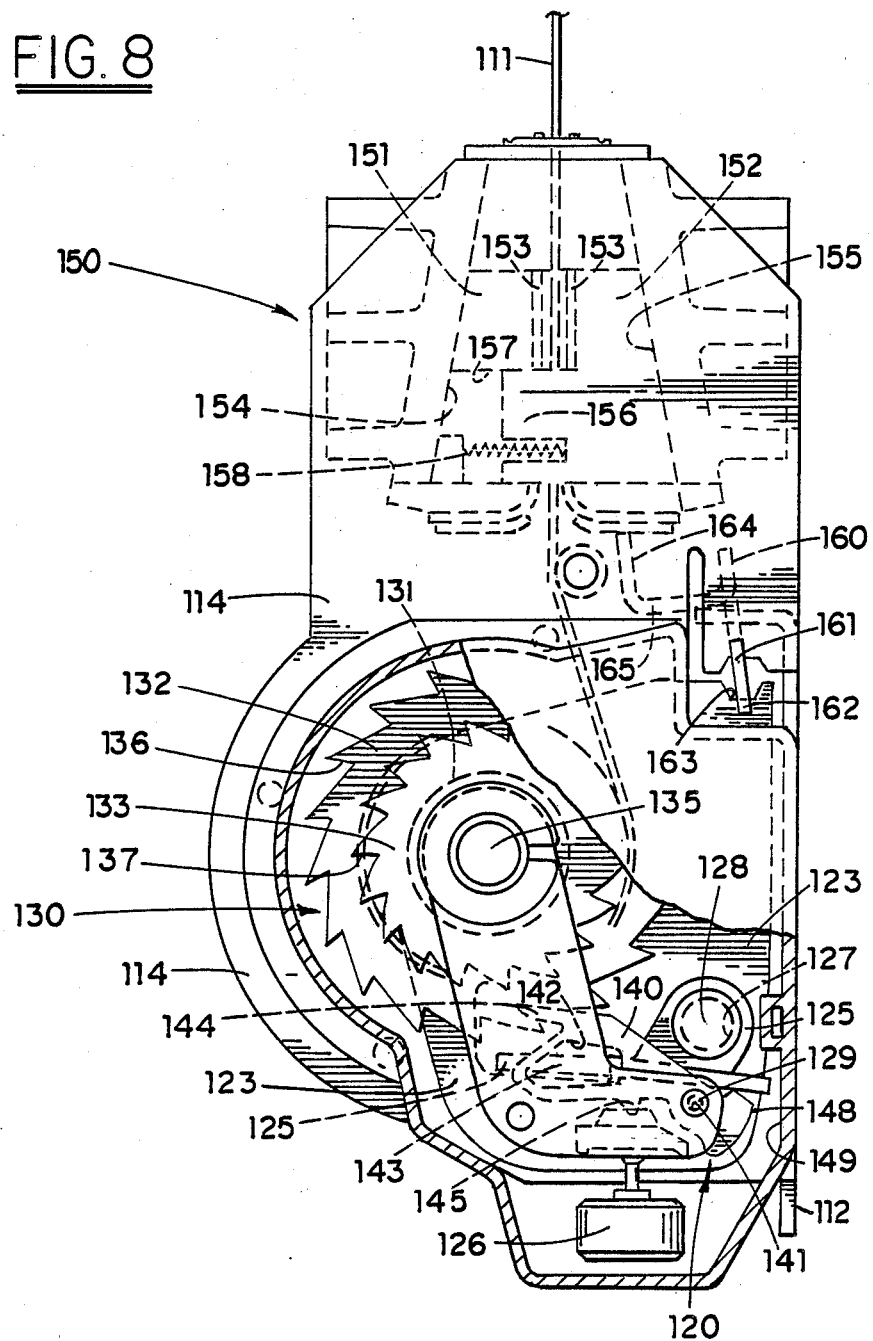
FIG. 8 is a partial cutaway sideview of the seat belt retractor of FIG. 7, taken in section along plane VIII of FIG. 7.

Referring initially to FIGS. 7 and 8, a safety belt retractor 110 of the prior art is shown. The retractor 110 comprises a frame 112 adapted to be mounted to the vehicle in a convenient location, for example vertically mounted at the vehicle door post. An inertia-activated pawl assembly, generally indicated as 120, is rotatably mounted relative to frame 112 in a manner which will be further described. Mounted in association with the pawl assembly 120 is the reel assembly 130 which comprises a central spindle 131 positioned between two sidewalls 113 and 114 of the retractor frame 112 which together form a spool about which the safety belt webbing 111 may be retractably wound. The reel assembly 130 includes axially extending shaft portions 134 and 135 which extend through and are journal-mounted by parallel sidewalls 113 and 114 of retractor frame 112. In addition, upon one of the shaft portions 135 is further fixedly mounted a ratchet wheel 132 which serves as the primary ratchet wheel for the primary inertia-sensitive locking mechanism.

The inertia-activated pawl assembly 120 which is rotationally mounted relative to frame 112 by shaft portion 135 and journal surfaces 121 and 122 permits a limited range of rotation relative to the retractor frame 112 between a deactivated position shown in FIG. 8 and an activated position. A spring (not shown) is contained within retractor frame 112 for biasing the inertia-activated pawl assembly 120 to rotate toward and maintain the deactivated position. The spring has a predetermined biasing force which determines the threshold protractive force required to be exerted on the seat belt webbing 111 in order to cause the pawl assembly 120 to rotate to the activated position. The effects of this force and rotation will be more fully described later.

The seat belt webbing 111 is attached to and wound about the spindle 131 of the reel assembly 130 such that as the seat belt webbing 111 is protracted, a spool-biasing spring 115 contained within housing 116 of retractor frame 112 is wound tighter thereby biasing the reel assembly 130 to retract the seat belt webbing 111 by revolving in the opposite direction as the protracting force thereon is released. As shown in FIG. 8, the safety belt webbing 111 is wound about the spindle 131 such that a protractive force on the webbing would cause a counter-clockwise rotation of the reel assembly. Consistent with this assembly a counter-clockwise limited rotation of the pawl assembly 120 would be associated with movement from the deactivated condition of FIG. 8 to the activated condition.

Pawl assembly 120 further includes a primary pawl member 125 disposed in relation to multiple teeth 136 of the primary ratchet wheel 132 of reel assembly 130 such that it may be forced into engagement with said teeth and thereby lock the reel assembly 130 against further protractive rotation in response to inertial forces exceeding a preselected level being exerted upon an inertial mass, in this embodiment a pendulum 126, as during an emergency condition.

More particularly, the reel assembly 130 is further provided with a deformable program ratchet wheel 133 fixedly mounted adjacent to primary ratchet wheel 132 upon shaft portion 135. The deformable program ratchet wheel 133 contains multiple teeth 136 about its periphery similar to primary ratchet wheel 132. Deformable ratchet wheel 133, however, is formed of a lightweight and inexpensive elastomeric material such as, in the preferred example, Delrin. Within the inertia-activated pawl assembly 120, the primary pawl member 125 is provided with an aperture 127 such that it may be pivotally mounted with respect to pawl assembly frame 123 about a post 128 of that frame. By this assembly, the primary pawl member 125 is capable of pivoting about post 128 such that a portion of the primary pawl member 125 may move radially inward and outward with respect to the reel assembly 130 and thereby selectably engage the multiple teeth 136 of the primary ratchet wheel 132.

Similarly, a deformable programming pawl 140 is also carried by the frame 123 of the pawl assembly 120. More specifically, the deformable programming pawl 140 is provided with a pivot aperture 141 such that it may be pivotally mounted with respect to frame 123 by a pivot 129 of that frame. The deformable programming pawl 140 may pivot about pivot 129 in such a manner that the engaging surface 144 of the pawl 140 may move radially inward and outward with respect to the reel assembly 130 such that the engaging surface 144 may selectively engage the multiple teeth 136 of the deformable program ratchet wheel 133 in a manner which will be described. The deformable program pawl 140 is further provided with a protrusion 145 for engaging the head of pendulum 126 or other inertia sensor to cause the deformable program pawl 140 to pivot about pivot 129 when vehicle inertia forces in excess of a preselected threshold amount are exerted upon the inertia sensor. Deformable program pawl 140 is provided with a cut-out 142 which cooperates with a laterally extending tongue portion 143 of primary pawl member 125. Similar to the deformable program ratchet wheel 133, deformable programming pawl 140 may be formed of a lightweight and inexpensive elastomeric material such as Delrin.

In accordance with a program feature of the pawl assembly, during operation, lock-up of the primary inertia-sensitive mechanism occurs in the following sequence. When vehicle inertial forces in excess of a preselected threshold level are experienced by the inertial mass or pendulum 126, that pendulum is tipped and thereby exerts a lifting pressure on protrusion 145 of the deformable programming pawl 140. This lifting causes deformable programming pawl 140 to pivot with respect to pawl assembly frame 123 about pivot 129 such that the engaging surface 144 of the deformable programming pawl 140 engages one of the multiple teeth 136 of the deformable program ratchet wheel 133. Once in this engaged position, a slight protraction of the seat belt webbing 111 causes a slight counter-clockwise rotation of the reel assembly 130 as particularly contemplated by the deformable nature of the programming pawl 140 and program ratchet wheel 133. This slight protractive rotation further pivots the deformable programming pawl 140 about its pivot 129 such that the lower surface of its cut-out 142 engages and lifts the laterally extending tongue 143 of the primary pawl member 125 such that the pawl member pivots about post 128 into direct and coordinated engagement with one of the multiple teeth 136 of the primary ratchet wheel 132. Since the primary pawl member 125 and the primary ratchet wheel 132 are formed of a load bearing material such as a metal, this engagement effectively locks the reel assembly 130 against further protractive rotation with respect to the pawl assembly 120. In this manner, the first of the dual emergency locking mechanisms for preventing safety belt protraction has been accomplished.

The exertion of further protractive force upon the seat belt webbing 111 by inertial forces on the vehicle occupant, due to tangential winding of the belt 111 with respect to the reel assembly 130, causes a further rotative force or moment to the entire pawl assembly 120 in the counter-clockwise direction. When this moment exceeds a preselected level, the clockwise biasing of the pawl assembly spring (not shown) is overcome and the entire pawl assembly 120, in particular frame 123, experiences a limited rotation with respect to retractor frame 112 in the counter-clockwise direction about journal surfaces 121 and 122 and shaft portion 135 from the deactivated position to the activated position. In the activated position, an edge 148 of the frame 123 of the pawl assembly 120 abuts an interior surface 149 of retractor frame 112 thereby limiting further counter-clockwise protractive rotation.

The second locking mechanism of this prior art retractor comprises an integrated web-locker, generally indicated at 150. The web-locker is positioned in front of the retractor reel assembly 130, in other words, between the reel assembly 130 and the vehicle occupant, such that the safety belt webbing 111 passes from the reel assembly 130 through the web-locker 150, and to the vehicle occupant. The web-locker 150 comprises clamping means which is carried by the frame 112 of the retractor for selectively clamping the safety belt against further movement relative to the clamping means in an immediate and assured manner. More particularly, the web-locker 150 has two opposing clamping wedges 151 and 152 which are provided with parallel and opposing gripping surfaces 153 between which passes the safety belt webbing 111. The clamping wedges 151 and 152 are positioned between inclined surfaces 154 and 155 of retractor frame 112 such that the spaced gripping surfaces 153 of the clamping wedges 151 and 152 are guided inward with respect to one-another into gripping relationship with the safety belt passing therebetween whenever the pair of clamping wedges 151 and 152 are translated along inclined surfaces 154 and 155 in the direction associated with further protraction of the safety belt webbing 111. By this arrangement, once the gripping surfaces 153 of clamping wedges 151 and 152 have become frictionally engaged with the safety belt webbing 111 as during a lock-up condition, further protractive forces on the safety belt webbing will tend to slide the clamping wedges 151 and 152 along the inclined surfaces 154 and 155 in a manner which even more effectively grips the safety belt webbing 111.

It is contemplated that the clamping wedges 151 and 152 translate or slide along the inclined surfaces 154 and 155 in the directions associated with protraction and retraction of the safety belt webbing in a coordinated manner. This is accomplished by the provision of a tongue 156 on one of the clamping wedges as particularly shown in FIG. 8 and a cooperating groove 157 on the other of the clamping wedges such that the two clamping wedges 151 and 152 may move only inward and outward with respect to one another as guided by the inclined surfaces 154 and 155. Additionally, spring 158 is provided to bias the clamping wedges 151 and 152 in an outward or nongripping direction such that gripping occurs only when the clamping wedge assembly has been driven along the inclined surfaces in the direction associated with safety belt protraction.

A web-locker actuator 160 is provided for causing motion of the clamping wedges 151 and 152 in the direction associated with protraction of the safety belt webbing, hereinafter referred to as an upward or locking direction. The web-locker actuator 160 comprises a lever having a fulcrum 161 mounted by the frame 112 about which the web-locker actuator 160 pivots relative to retractor frame 112, a follower portion 162 which is engaged by a cam edge 163 of the rotatable frame 123 of the inertia-actuated pawl assembly 120 to cause the web-locker actuator 160 to pivot about fulcrum 161, and a wedge driving portion 164 which engages and drives the clamping wedges 151 and 152 in the locking direction.

In operation, after lock-up of the retractor reel assembly 130 by the primary lock-up mechanism and a further protractive force being exerted on the safety belt webbing 111 in excess of a preselected threshold amount, frame 123 of the pawl assembly 120 experiences a limited rotation in the manner previously described from the deactivated to the activated position. This rotation causes the cam edge 163 of frame 123 to engage follower portion 162 of the web-locker actuator 160 thereby causing the actuator to pivot about its fulcrum 161 such that wedge driving portion 164 drives the clamping wedges 151 and 152 in a locking direction. In response to the driving forces of the wedge driving portion 164, the web-locker 150 experiences an immediate and assured lock-up by which the clamping wedges 151 and 152 are driven by the wedge driving portions 164 in the locking direction, sliding along the inclined surfaces 154 and 155 of frame 112 such that the opposing gripping surfaces 153 are forced inward, overcoming the biasing of spring 158, and into gripping contact with the safety belt webbing 111 passing therebetween. Any further protractive force on the safety belt webbing 111, due to the contact with the gripping surfaces 153 and under the action of the inclined surfaces 154 and 155, simply causes the web-locker 150 to more securely grip the safety belt webbing and thereby prevent any further protractive motion. This locking action of web-locker 150 involves an upward motion of wedge driving portion 164 in the locking direction shown by arrow 165 in FIG. 7 causes the clamping wedges 151 and 152 to slide along the inclined surfaces 154 and 155 and thus inward with respect to one another and thus into gripping contact with the safety belt webbing 111 passing therebetween.

The clamping wedge shown in FIGS. 1–6 may be used in a vehicle seat belt retractor similar to those shown in patent specifications GB-A-2126876 and GB-A-2177891, the contents of which are incorporated into this specification by reference, in replacement for the clamping wedges of the retractors described in those specifications. For further information about the construction of the retractors, reference should now be made to the two specifications referred to.

Figure 1:
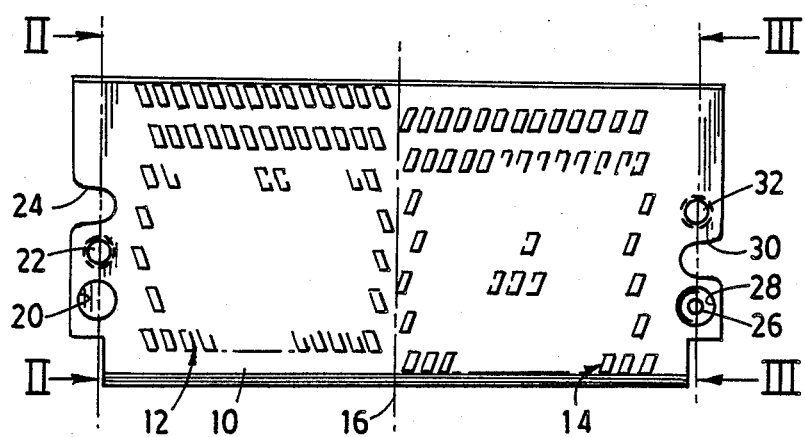
FIG. 1 is a plan view of the clamping surface of a clamping wedge of a web locker of a vehicle seat belt retractor.

The wedge shown in the drawings is moulded from a thermosetting resin material such as Vynckier "Vyncolite" Thermoset RX613. Any other material of sufficient rigidity could alternatively be used. The clamping surface of the wedge is visible in FIG. 1. It will be seen that the wedge has a base surface 10 from which respective first and second arrays 12, 14 of teeth protrude, the arrays lying respectively to the left and right (as shown in FIG. 1) of a centre line 16 which extends longitudinally of the seat belt. The teeth of the second array 14 are a mirror image about a plane extending perpendicularly to the plane of the paper and including the centre line 16 of the teeth of the first array 12, except that the teeth of the second array 14 are staggered in both the x- and y- directions (i.e. perpendicularly and parallel to the line 16 respectively) relative to the teeth of the first array 12 The teeth of each array are arranged in rows extending perpendicularly to the centre line 12. The teeth of each row are spaced with a pitch (hereinafter "x-pitch") of approximately 1.50 mm. The rows of teeth in each array are spaced with a pitch (hereinafter "y-pitch ") of 3.40 mm. The extent of each tooth in the x-direction is approximately 0.80 mm, whilst each tooth has an extent in the y-direction of approximately 1.50 mm. The staggering of the second array 14 relative to the first array 12 is such that each tooth of the second array is displaced from its mirror-image position in both the x-direction and the y-direction by distances equal respectively to one-half of the x-pitch and one-half of the y-pitch.

Adjacent the left-hand side edge of the wedge (as seen in FIG. 1), the wedge is moulded to have, in succession from the end of the wedge which is lowermost in FIG. 1, a cylindrical recess 20, a first cylindrical post 22 and a first U-shaped cut-out 24. The axes of the recess 20 and the post 22 extend perpendicularly to the base surface. Adjacent the right-hand side edge of the wedge there are, again in succession from the lower end edge, a second cylindrical post 26, which extends perpendicularly to the base surface and is surrounded by an annular recess 28, a second U-shaped cut-out 30 extending to the right-hand side edge of the wedge and a third cylindrical post 32. The second and third cylindrical posts 26, 32 extend perpendicularly to the base surface and are dimensioned for reception in the cylindrical recess 20 and the first U-shaped cut-out 24 of an identical clamping wedge. Similarly, the first cylindrical post 22 is dimensioned for reception in the second U-shaped cut-out 30 of an identical wedge.

The rear face 34 of the clamping wedge is visible in FIGS. 2 and 3. It is inclined at an angle of about 10 degrees to the clamping surface and is thus positioned for sliding contact with wedged surfaces of an appropriately shaped cavity of a seat belt retractor such as that shown in GB-A-2113978 or GB-A-2177891. The rear face of the clamping wedge has a layer 36 of low-friction material, for example polytetrafluoroethylene. Alternatively or additionally, low-friction material could be applied to the surfaces of the retractor cavity contacted by the clamping wedges.

When two clamping wedges as shown in FIG. 1 are assembled in a web-locking retractor, the co-operation between the two wedges is similar to that suggested by the combination of FIGS. 2 and 3. In such cooperation, the first cylindrical post 22 of each wedge is received in the second U-shaped cut-out 30 of the other wedge, each second cylindrical post 26 is received in the cylindrical recess 20 of the other wedge and each third cylindrical post 32 is received in the first U-shaped cut-out 24 of the other wedge. Further, each post 26 is surrounded by a helical compression spring 27 which is seated at its ends on the ends of the recesses 20, 28 of the two wedges which are thus constrained to move relative to each other against the bias of the springs in directions perpendicular to their base surfaces. In the assembled retractor, the belt extends between the clamping surfaces of the wedges, the clamping surfaces being held from contact with the belt by the compression springs. Because of the staggered relationship between the teeth of the first and second arrays 12, 14, the teeth of each first array 12 of one wedge are aligned with spaces between the teeth of the second array 14 of the other wedge and the teeth of the second arrays 14 are aligned with inter-tooth spaces of the first arrays. Thus, when the wedges move towards each other in the direction in which they are constrained, the teeth of the two wedges interfit as their teeth penetrate the webbing to engage therewith to clamp the belt between the clamping faces.

Figure 4:
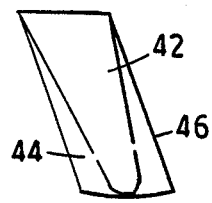
FIG. 4 is a plan view of one tooth of the clamping wedge of FIG. 1.
Figure 5:
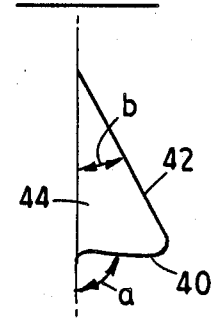
FIG. 5 is a side view of the tooth of FIG. 4.
Figure 6:
FIG. 6 is an end view of the tooth of FIG. 4 showing the leading face of the tooth.

FIGS. 4, 5 and 6 show a clamping wedge tooth in detail. It will be seen that the tooth has a distorted pyramidal shape having four approximately-triangular sides and a base which approximates to a parallelogram. The leading face of the tooth is formed by a slightly under-cut face 40 which makes an angle a of 85 degrees with the base surface of the clamping wedge. The trailing face of the tooth is formed by a further face 42 which is inclined at an angle b of 30 degrees to the base surface. Each side face of the tooth is formed by another face 44 or 46 which an angle c of 68 degrees to the base surface. Each tooth has a longitudinal medial line 48 which lies at an angle d of 20 degrees to the longitudinal centre line 16 of the wedge.

In the assembled seat belt retractor, two wedges are fitted together as described above and are received between fixed inclined surfaces with which the rear faces 34 of the wedges are in sliding contact. The fixed surfaces taper inwardly towards each other in the direction of belt protraction. The seat belt lies between the clamping faces of the wedges, the centre lines 16 of which are aligned with the direction of belt protraction. In the free condition of the web locker, the clamping faces are each spaced from the belt which is freely protractable and retractable therebetween.

The retractor is arranged to lock under a predetermined condition, for example onset of an acceleration above a threshold value. In such circumstances, operating means of the retractor cause movement of the wedges in the direction of belt protraction. Because of the co-operation between the rear faces 34 of the wedges and the inclined retractor surfaces, the wedges also move together so that their teeth contact the belt. It should be noted that wedge movement thus has a component in the belt-protraction direction. If, as will usually be the case, the belt is undergoing protraction at the time of this movement of the wedges, the initial engagement between the teeth and the belt will cause the wedges to be drawn with the belt in the direction of its protraction. This movement will be additional to any movement imparted to the wedges by the retractor operating means and will enhance the clamping effect of the wedges on the belt. As described above, this clamping is effected with the teeth of one wedge fitting between the spaces between the teeth of the other wedge to clamp the belt therebetween, the teeth of the respective wedges displacing the fibres of the belt as they penetrate the material thereof in order to engage therewith. During this engagement, the component of wedge movement in the protraction direction minimises or avoids relative movement between the belt surfaces and the wedges in the belt-protraction direction at the onset of clamping and is important in producing a clamping engagement which does not subject the belt to significant shear loads which can cause damage to the belt.

It will be evident that those skilled in the art may make numerous modifications of the specific embodiment described above without departing from the present inventive concepts. It is accordingly intended that the invention shall be construed as embracing each and every novel feature and novel combination of features present in or possessed by the article herein described and that the foregoing disclosure shall be read as illustrative and not as limiting except to the extent set forth in the claims appended hereto.

I claim:

1. A vehicle seat belt system having clamping means for the belt thereof, the clamping means comprising first and second belt-engagement members which are movable towards each other and into engagement with the belt so that the belt is clamped between respective surfaces of the members and protraction of the belt is prevented, the system including operating means for the clamping means, the operating means being responsive to a pre-determined condition to cause operation of the clamping means, wherein each belt-engagement surface has an array of teeth thereon, the vertex of the teeth having means for penetration into the material of the belt in order to engage therewith and each array comprising a plurality of parallel rows of teeth, the rows being spaced apart to define a plurality of inter-row spaces, the rows of teeth of each array being aligned across the belt with the inter-row spaces of the other array so that, upon clamping, the rows of teeth of each array are received in the inter-row spaces of the other array.

2. A seat belt system as claimed in claim 1, wherein the rows of teeth extend substantially perpendicularly to the direction of protraction of the belt.

3. A seat belt system as claimed in claim 1, wherein the teeth of each row are spaced from one another in the direction of extent of the rows by a distance approximately equal to the extent of each tooth in that direction.

4. A seat belt system as claimed in claim 1, wherein the rows of teeth are spaced in the direction perpendicular to the direction of extent of the rows by a distance approximately equal to the extent of each tooth in said perpendicular direction.

5. A seat belt system as claimed in claim 1, wherein each row of teeth extends to one side only of an imaginary centre line of its respective array, alternate rows of each array extending outwardly in opposite directions from the respective imaginary centre line, so that each row lies perpendicularly opposite across its respective centre line to an inter-row space.

6. A seat belt system as claimed in claim 5, wherein the imaginary centre line extends in the belt-protraction direction.

7. A seat belt system as claimed in claim 1, wherein the belt-engagement members have means restraining the members for movement relative to each other in directions perpendicular to the plane of the belt.

8. A seat belt system as claimed in claim 7, wherein the restraining means comprise one or more posts protruding from each member and received in corresponding apertures in the other member.

9. A seat belt system as claimed in claim 7, wherein resilient biasing means act between the clamping members to bias the members apart.

10. A seat belt system as claimed in claim 7, wherein the said movement of each clamping member has components parallel and perpendicular to the belt-protraction direction.

11. A seat belt system as claimed in claim 10, wherein the belt-engagement members comprise respective clamping wedges.

12. A seat belt system as claimed in claim 1, wherein the formations of the belt-engagement surfaces engage the belt to produce a clamping force which has components in the plane of the belt and respectively parallel to the belt-protraction direction and perpendicular thereto.

13. A seat belt system as claimed in claim 1, wherein the teeth are inclined to the belt-protraction direction.

14. A seat belt system as claimed in claim 13, wherein the teeth are inclined at an angle of approximately 20° to the belt-protraction direction.

15. A seat belt system as claimed in claim 1, wherein the leading face of each tooth relative to the direction of belt-protraction is undercut.

16. A seat belt system as claimed in claim 15, wherein the leading face of each tooth makes an angle of approximately 5° with a line normal to the plane of the belt.

17. A vehicle seat belt system as claimed in claim 1, the clamping means being incorporated into a vehicle seat belt retractor having a belt storage means for the seat belt and from which the belt can be protracted for use.

* * * * *